US006438145B1

(12) United States Patent
Movshovich et al.

(10) Patent No.: US 6,438,145 B1
(45) Date of Patent: Aug. 20, 2002

(54) TRANSPORT PACKET DISTRIBUTION SYSTEM AND METHOD USING LOCAL HEADER

(75) Inventors: Alek Movshovich, Santa Clara; Robert H. Hoem, San Jose; Niranjan A. Puttaswamy, Santa Clara; Brian Lai, Milpitas, all of CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/205,756

(22) Filed: Dec. 4, 1998

(51) Int. Cl.$^7$ .................................................. H04J 3/04
(52) U.S. Cl. ...................................................... 370/536
(58) Field of Search ................................. 370/389, 399,
370/398, 351, 352, 464, 465, 474, 335,
537, 395, 428, 536, 466, 468, 442, 347,
341, 469, 471, 473, 476, 477, 482, 485,
486, 484, 489; 348/14.01, 14.04, 14.13,
384.1, 385.1, 389.1, 404.1, 426.1, 441,
469, 461, 467

(56) References Cited

U.S. PATENT DOCUMENTS 5,748,199 A * 5/1998 Palm ........................... 345/473
5,847,771 A * 12/1998 Cloutier et al. ............. 348/564
5,889,949 A * 3/1999 Charles ................... 395/200.44

OTHER PUBLICATIONS

Texas Instruments 1394 Product Bulletin, *Mixed Signal & Analog Products*, Copyright 1998.
Texas Instruments 1394 Product Bulletin p. 2, *Mixed Signal & Analog Products*, Copyright 1998.
Adam J. Kunzman and Alan T. Wetzel, 1394 High Performance Serial Bus: The Digital Interface for ATV, Texas Instruments.

* cited by examiner

*Primary Examiner*—Dang Ton
(74) *Attorney, Agent, or Firm*—Peter Zawilski

(57) ABSTRACT

Transport packet demultiplexing and distribution, is enhanced in a digital transport demultiplexing system that inputs a stream of digital multimedia transport packets. According to an example embodiment, each of the transport packets includes a packet identifier (PID) to identify the digital program or elementary stream to which it corresponds. Local packet information is generated for each of the transport packets, which is used in identifying and distributing the transport packets. A local header is created that includes the generated local packet information, and the local header is linked to its corresponding transport packet to create a modified transport packet. In this manner, each of the modified transport packets represents a self-contained digital transport packet having local distribution information contained therein.

38 Claims, 8 Drawing Sheets

TRANSPORT PACKET DISTRIBUTION SYSTEM AND METHOD USING LOCAL HEADER

FIELD OF THE INVENTION

The present invention relates generally to digital audio/video program and transport stream demultiplexing. More particularly, this invention relates to a system and method for demultiplexing and distributing transport packets, such as MPEG-2 transport packets, by generating and associating a locally-generated header with each of the transport packets to create a self-contained modified packet which incorporates essential distribution information therein.

BACKGROUND OF THE INVENTION

The development of digital video technology has made possible a variety of telecommunication applications, including video conferencing, video telephony, high-definition television (HDTV), and motion pictures at our desktops to name but a few. The multi-media explosion, including still pictures, moving video, and audio, is already proliferating the threads of the World Wide Web. Technological advances in digital video are presenting new opportunities as well, such as for existing quality television distribution, interactive television, and movies and news on demand.

In order to reduce the high cost of video compression codecs and resolve manufacturer equipment interoperability issues, standardization of digital video techniques has been a high priority. Furthermore, as the computer, telecommunications, and consumer electronics industries continue to amalgamate, the need for standardization becomes more prevalent. To address these and other issues, the International Organization for Standardization (ISO) has undertaken efforts to provide standards for various multi-media technologies, including digital video and audio. The expert group of the ISO that has undertaken this obligation is the Moving Picture Experts Group (MPEG). While the MPEG-1 standards addressed many of the issues facing digital video transmission today, they were not suited for broadcast environments or television applications. Therefore, the ISO developed the MPEG-2 standard (ISO/IEC 13818) to respond to these needs.

The MPEG-2 standard does not, however, define each part of the digital link. This allows for expansion and enhancement of the market via the technology industry. For example, while the MPEG-2 defines a format that can be used to describe a coded video bitstream, it does not specify the encoding method. Instead, it defines only the resulting bit stream.

The MPEG-2 standard is often associated with the video compression aspect of digital video. While video compression is an important part of the MPEG standards, MPEG-2 includes a family of standards involving different aspects of digital video and audio transmission and representation. The general MPEG-2 standard is currently divided into eight parts, including systems, video, audio, compliance, software simulation, digital storage media, real-time interface for system decoders, and DSM reference script format.

The video portion of the MPEG-2 standard (ISO/IEC 13818-2) sets forth the manner in which pictures and frames are defined, how video data is compressed, various syntax elements, the video decoding process, and other information related to the format of a coded video bitstream. The audio portion of the MPEG-2 standard (ISO/IEC 13818-3) similarly describes the audio compression and coding techniques utilized in MPEG-2. The video and audio portions of the MPEG-2 standard therefore define the format with which audio or video information is represented.

Another important part of the MPEG-2 standard is the MPEG-2 Systems portion (ISO/IEC 13818-1). At some point, the video, audio, and other digital information must be multiplexed together to provide encoded bitstreams for delivery to the target destination. The Systems portion of the standard defines how these bitstreams are synchronized and multiplexed together. Typically, video and audio data are encoded at respective video and audio encoders, and the resulting encoded video and audio data is input to an MPEG-2 Systems encoder/multiplexer. This Systems multiplexer can also receive other inputs, such as control and management information, private data bitstreams, and time stamp information. The resulting coded, multiplexed signal is referred to as the MPEG-2 transport stream. More specifically, it is referred to as the transport stream where the digital information is delivered via a network to be displayed in real time, and is referred to as a program stream where a local media-based system is used (e.g., CD-ROM, local hard disk, etc.).

The video and audio encoders provide encoded information to the Systems multiplexer provide this information in the form of an "elementary stream". The encoded output of a video encoder provides a video elementary stream, and the encoded output of an audio encoder provides an audio elementary stream. In each of these cases, the elementary stream can be organized into "access units", which can represent a picture or an audio frame depending on whether it is part of the video or audio elementary stream. These elementary streams are "packetized" into packetized elementary streams (PES) which are comprised of many PES packets. Each PES packet is size-variable, and includes a packet payload corresponding to the data to be sent within the packet, and a PES packet header that includes information relating to the type, size, and other characteristics of the packet payload. The PES packet payloads are not fixed-length, which allows the packet payload to correspond to the access unit of its particular elementary stream.

PES packets from the video and audio encoders are mapped into transport stream packets (TSP) at the Systems encoder/multiplexor. Each TSP includes a payload portion which corresponds to a fixed-length portion of the PES packet stream, and further includes a TSP header. The transport stream packet header provides information used to transport and deliver the information stream, as compared to the PES packet header that provides information directly related to the elementary stream. Although one PES packet may occupy multiple transport packets, byte "stuffing" is used to fill the remainder of a transport packet payload which was not completely filled by a PES packet, thereby allowing each PES header to be positioned at the beginning of the transport packet payload. This allows the PES header to be more easily synchronized at the decoder.

The consecutive flow of transport stream packets form the MPEG transport stream. MPEG-2 Systems provide for two types of transport streams. The first is the single program transport stream (SPTS), which contain different PES streams, but share a common time base. The multi-program transport stream (MPTS) is a multiplex of various single program transport streams, which in turn may be multiplexed into various network channels for multi-channel delivery to the media user.

The challenge then becomes determining an efficient manner to extract the desired information from the program or transport stream for decoding at the video, audio, or other decoders. Before the transport stream is decoded, the transport packets must undergo analysis, synchronization, demultiplexing, as well as other packet manipulating functions. These functions can be managed by devices such as a MPEG transport demultiplexor, and must be managed properly to execute the functions in the most efficient manner possible to enhance packet transport speed and ease. Due to the extraordinarily high data transfer requirements associated with motion video, packet throughput time is a paramount concern.

One problem affecting the efficiency of such transport demultiplexors is the potentially inefficient use of processor time is generating memory addresses for each of the elementary streams. Prior art systems have utilized the processor to individually determine where each elementary stream should be stored prior to being sent to their respective decoders. This, however, can reduce the amount of time that the processor can be used for other processing tasks. Furthermore, the processor may need to obtain information from within the system in order to create the addressing information, which can further reduce processor capacity and affect system speed.

Accordingly, there is a need for a system and method for enhancing transport packet demultiplexing and distribution in a digital transport demultiplexing system. The present invention allows the transport packet demultiplexing system to manage packet storage and packet attribute information in an efficient and organized manner. The present invention therefore offers advantages and provides solutions to shortcomings of the prior art.

SUMMARY OF THE INVENTION

The present invention is directed to a system and method for demultiplexing and distributing transport packets, such as MPEG-2 transport packets, by generating and associating a locally-generated header with each of the transport packets to create a self-contained modified packet which incorporates essential distribution information therein.

In accordance with one embodiment of the invention, a method for enhancing transport packet demultiplexing and distribution in a digital transport demultiplexing system that inputs a stream of digital multimedia transport packets is provided. Each of the transport packets includes a packet identifier (PID) to identify the digital program or elementary stream to which it corresponds. Local packet information is generated for each of the transport packets, which is used in identifying and distributing the transport packets. A local header is created that includes the generated local packet information, and the local header is linked to its corresponding transport packet to create a modified transport packet. In this manner, each of the modified transport packets represents a self-contained digital transport packet having local distribution information contained therein.

In accordance with another aspect of the invention, a transport stream demultiplexing apparatus for use in a digital transmission system capable of providing a plurality of digital transport packets to a digital program presentation device is provided. Each of the digital transport packets includes a packet identifier (PID) to identify the digital program to which it corresponds. The transport stream demultiplexing apparatus includes a PID match unit, which uses a comparator to compare the PID from each of the transport packets to predefined PID values. An address designator within the PID match unit provides a unique memory address identifier for each matching set of the PIDs and the predefined PID values. A local header generation module receives the unique memory address identifier, and arranges the unique memory address identifier into an address field to form a local header. A local header affixation module has a control input to selectively direct the transport packet or the local header to its output, which is dependent on the state of one or more input control signals. A packet arrangement control module generates the input control signals, to control the local header affixation module so that it outputs the local header immediately followed by a corresponding one of the transport packets.

In accordance with yet another embodiment of the invention, a transport stream demultiplexing apparatus for use in an MPEG-compliant digital transmission system is provided. The digital transmission system provides a plurality of digital transport packets to a digital program presentation device, and each of the digital transport packets includes a packet identifier (PID) to identify the digital program to which it corresponds. The transport stream demultiplexing apparatus includes a transport packet analyzer to receive the digital transport packets, and provides packet distribution information for each of the transport packets. A local header affixation module is provided, having a control input to selectively provide either the transport packet or a local header, depending on a state of input control signals, to an output of the local header affixation module. A local header generation module is also provided, which includes a local header sequencing module coupled to the transport packet analyzer to receive and arrange the packet distribution information into a plurality of bytes to create a multi-byte local header. The local header generation module also includes a packet arrangement control module to generate and provide the input control signals to the local header affixation module, where the input control signals direct the local header affixation module to output the local header immediately prior to a corresponding one of the transport packets to form a modified transport packet.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which.

Figure 1:
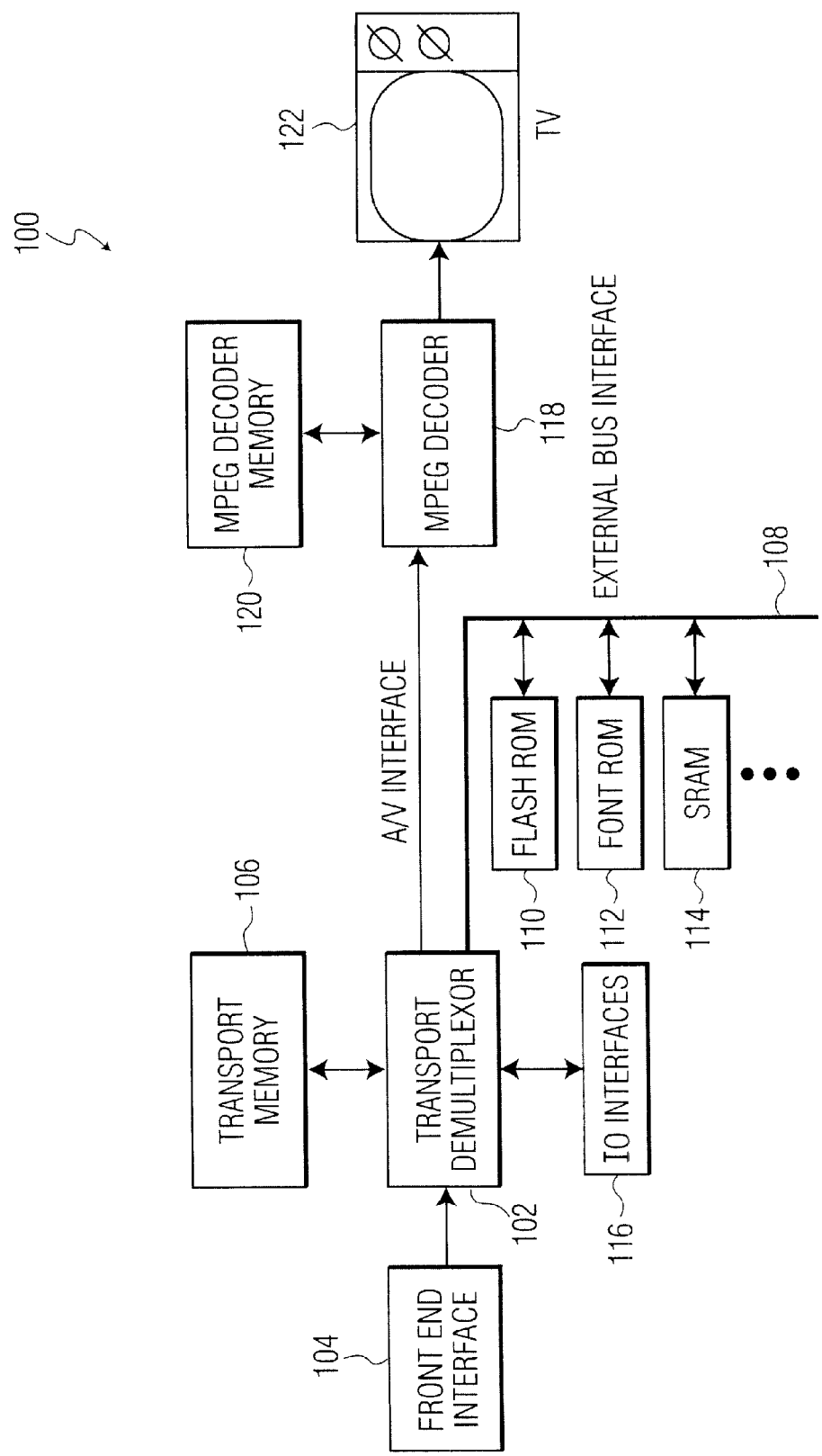
FIG. 1 is a block diagram of an illustrative set-top box system implementation incorporating a digital video transport system in accordance with the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is particularly advantageous in digital multimedia communications systems implementing the MPEG (Moving Pictures Experts Group) standards such as the MPEG-1 (ISO/IEC 11172-X) and MPEG-2 (ISO/IEC 13818-X) standards, and in transport stream applications relating to digital video in broadband networks. While the present invention may be applicable to many digital communication environments, an appreciation of the invention is best obtained in the context of the following diagrams, in which an MPEG-2 transport stream demultiplexing system is shown according to the present invention.

FIG. 1 is a block diagram of an illustrative set-top box 100 system implementation incorporating a digital video transport system 102 in accordance with the present invention. A set-top box is one of the key components of the modern information superhighway, and is the module that can turn an ordinary television into a sophisticated, interactive, video/audio system. The set-top box can take on a variety of roles, including: serving as a gateway to subscription and pay-per-view services digitally delivered by satellite, cable or terrestrial links; information-on-demand and other interactive services; low cost entrance to the Internet; games console for advanced 3-D video games, and more.

The input of the set-top box 100 includes the front end interface 104. The front end interface 104 which includes satellite, cable and terrestrial demodulators to receive the transport packets. The transport packets are provided to the digital video transport system 102, which in the present embodiment is an MPEG-2 transport system. The MPEG-2 transport system 102 of the present invention provides various functions, including transport stream synchronization and demultiplexing, cached processing capabilities for transport and application processing, dynamic random access memory (DRAM) control for the transport memory 106, external system interfacing via the external bus interface 108 to various external components such as the flash read only memory (ROM) 110, the font ROM 112 and the static RAM (SRAM) 114, and various set-top box peripheral input/output (I/O) functions via the I/O interfaces 116.

The MPEG-2 transport demultiplexor 102 is also coupled to a digital decoding unit 1118, which includes the video and audio decoders, which utilizes the decoder memory 120. The decoded information can then be used by consumer devices, such as television 122.

Figure 2:
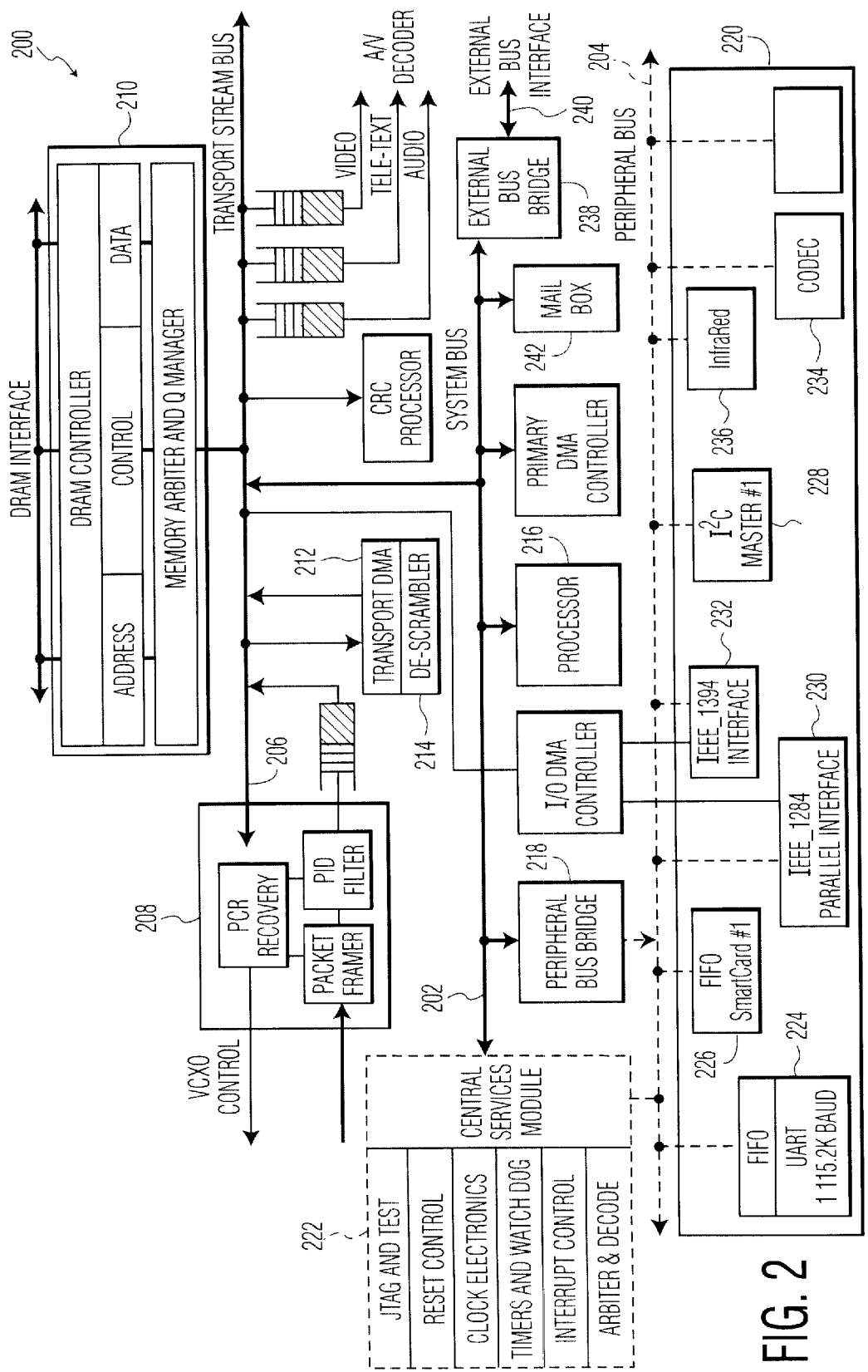
FIG. 2 is a block diagram of one embodiment of an MPEG transport demultiplexor in accordance with the present invention.

FIG. 2 is a block diagram of one embodiment of an MPEG transport demultiplexor 200 in accordance with the present invention. In the embodiment described herein, the description will discuss the MPEG-2 standard. However, as will be appreciated by those skilled in the art from the following description, the principles described herein are applicable to other packet-based technologies. While some of the general functions of the MPEG-2 transport demultiplexor 200 are described in connection with FIG. 2, more specific implementations and functions are described in greater detail in connection with the ensuing diagrams.

The MPEG-2 transport demultiplexor 200 utilizes three internal buses, including the system bus 202, peripheral bus 204, and the transport stream bus 206. The system bus 202 is the transport demultiplexor processor bus for the processor, which in one embodiment is a 32-bit bus coupled to an advanced RISC machine (ARM). The peripheral bus 204 is oriented to slow speed devices, and supports all I/O interfaces to the MPEG-2 transport demultiplexor 200. The transport stream bus 206 essentially carries all transport stream data to and from the transport memory.

The packet framer module 208 receives the MPEG-2 transport packets from the front end interface demodulators. The transport packets may be input serially or in parallel bytes. The packet framer module 208 provides functionality including synchronization byte detection with programmable synchronization values, synchronization byte lock and unlock hysteresis, packet alignment with programmable packet lengths, hardware packet identifier (PID) comparison, and packet discard capabilities.

A memory controller 210 includes a queue manager, arbiter, and RAM controller. The memory controller 210 supports both EDO-DRAM, SDRAM, and SRAM. The queue manager provides rate buffer control for the transport stream data, while the memory controller supports a host interface for the ARM processor code and associated data space.

The transport DMA controller 212 is a scatter-gather DMA engine controlled by memory-resident data structures which establish a control program. This multi-channel DMA, together with the memory controller queue manager, provides a mechanism for memory-to-memory or I/O transfers while achieving effective rate buffering and performing associated functions for the transport stream. The transport DMA controller 212 works in conjunction with the de-scrambler 214 to decrypt the data during these memory or I/O transfers.

The processor 216 is the host processor for the MPEG-2 transport demultiplexor 200. In one embodiment of the invention, the processor 216 is an ARM having on-chip caching functionality to reduce the bandwidth requirements of the on-board memory.

The peripheral bus bridge 218 interfaces the system bus 202 to the peripheral I/O devices 220, the central services module 222, and other data registers. This bus provides connectivity to slave devices. A representative sample of many of the peripheral devices supported by the MPEG-2 transport demultiplexor 200, which includes serial I/O 224, smart card interfaces 226, I$^2$C interfaces 228, IEEE-1284 and IEEE-1394 interfaces 230, 232, codec interfaces 234 for modems, and infrared interfaces 236.

The central services module 222 provides the maintenance functions for the system. The functions handled by the central services unit include reset and power-up control, interrupt control, timer counters, bus arbitration, watch dog timers, bus timeout functions, and Joint Test Action Group (JTAG) capabilities for ARM emulation and test functionality.

The external bus bridge interfaces the system bus 202 to the external bus interface 240, and provides connectivity for external ROM, RAM, and external MPEG decoders. The external bus interface supports master and slave interfaces. The ARM 216 is the master on the external bus interface 240. The MPEG-2 transport demultiplexor 200 supports slave mode through a strap option. The ARM 216 acts as a slave to an external CPU, and communicates through a memory based mail box 242. The external master device can then access all of the on-chip resources of the MPEG-2 transport demultiplexor 200.

Figure 3:
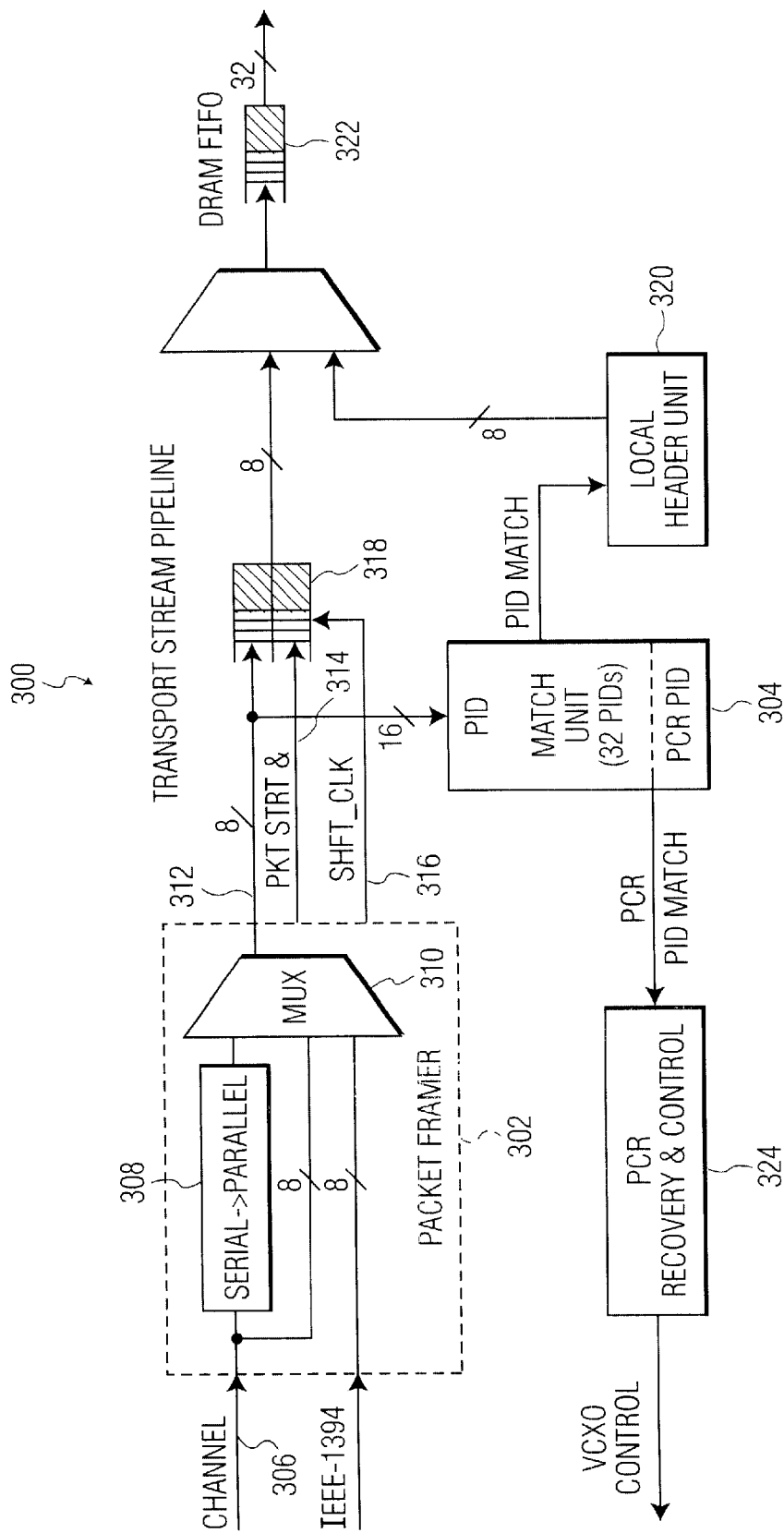
FIG. 3 is a block diagram of one embodiment of a transport packet management circuit in accordance with the present invention.

FIG. 3 is a block diagram of one embodiment of a transport packet management circuit 300 in accordance with the present invention. The packet management circuit 300 represents the transport front end, where transport packets are received at the MPEG-2 transport demultiplexor from an input channel or demodulator unit.

Generally, the packet framer 302 performs packet framing and byte alignment, as well as synchronization detection. The packet framer 302 continuously searches for the MPEG synchronization byte in the header of the incoming transport data stream. For MPEG-2 applications, the synchronization byte is used to locate the start of a transport packet, and has a hexadecimal value of 0x47. The packet framer 302 locates the synchronization byte among the rest of the transport data byte stream by tracking the arrival of synchronization bytes every transport packet interval. This is controlled by registers which establish the conditions under which the framer enters and exits a synchronization lock condition. The framer 302 forwards the data to the PID match unit 304 when an entire transport packet has been delineated from the transport data stream. For example, in a digital video broadcasting (DVB) application, the DVB transport stream is a 188-byte stream having a byte value 0x47 in the first byte of the transport header. When this value is detected a SYNC_LOCK signal is asserted, and the packet framer 302 outputs the transport packet to the PID match unit 304.

The packet framer 302 can receive inputs of various types, including serial and parallel input, as seen on channel input line 306. Where serial input is received, the serial-to-parallel converter 308 converts the input to a parallel 8-bit input to the multiplexor 310. Other interfaces, such as the IEEE-1394 standard, may also serve as inputs to the packet framer 302. A control signal coupled to the multiplexor 310 selects which input to accept to provide the transport stream at the output of the packet framer 302, which in one embodiment is provided in 8-bit bytes as shown on output bus 312. A PACKET_START signal shown on line 314 is asserted coincident with recognition of the synchronization byte to indicate the first byte of a transport packet. The PACKET_START signal triggers processing of the transport packet header information. The transport stream output on bus 312, the PACKET_START signal on line 314, and a SHIFT_CLOCK signal on line 316 are provided by the packet framer 302 to the transport stream pipeline 318, which is described more fully in connection with FIG. 5.

A transport packet is generally a fixed-length packet having a transport packet header and a packet payload that includes the PES packets. MPEG-2 transport packets include a transport packet header, an adaptation field, and a payload field containing the PES packets. Within the transport packet header is a packet identifier (PID), which is a 13-bit field used to identify transport packets which carry PES data from the same elementary stream, and to define the type of payload in the transport packet payload.

MPEG-2 allows for multiple audio/video programs to be provided per carrier, resulting in a multi-program transport stream (MPTS) which is a multiplex of a number of single program transport streams (SPTS). Each SPTS may contain different PES streams, each of which carries different video, audio and possibly data information all corresponding to a common program. Time division multiplexing (TDM) is used to concurrently transmit the multiple programs in an MPTS. Because the MPEG-2 transport stream can include a multiplex of audio/video programs, the MPEG transport demultiplexor 200 must determine which transport packets are part of the desired program in order to pass them on to the external MPEG decoders for further processing. The transport packets that are not part of the desired program can be discarded. The PID match unit 304 makes the determination of which PIDs are part of the desired program.

The PID match unit 304 plays an important role in multi-program transport stream management. The PID match unit 304 locates transport packets with matching PIDs, and forwards them to the local header unit 320. One aspect of the present invention is the generation of a local header by the local header unit 320. The local header is concatenated with the transport stream at the output of the transport stream pipeline 318 shown on output bus 318, and is used to distribute information throughout the transport demultiplexer. The transport packets, along with the associated local header, are forwarded to a FIFO 322 to eventually be stored to memory, which in one embodiment of the invention is a DRAM. The PID match unit 304 also includes program clock reference (PCR) PID matching, and corresponding PCR recovery circuitry 324.

In one embodiment of the invention, the PID match unit 304 includes a PID table of 32 PID entries. This table is organized as a 32-bit wide RAM with 16 locations (each location provides 2 PID entries). The table is updated by the host processor, such as processor 216 of FIG. 2. The PID table is updated when the system is first powered up and when the view changes the channel being viewed. Upon every power up sequence, the PID table is expressly updated by the host. Similarly, the host updates the PID table when a viewer performs a change channel operation. Both of these updates to the PID table are performed by the host using an alternate path to the PID match table address. A hardware interlock mechanism within the PID match unit forces the host to wait if updates are made when the PID match logic is active.

Figure 4:
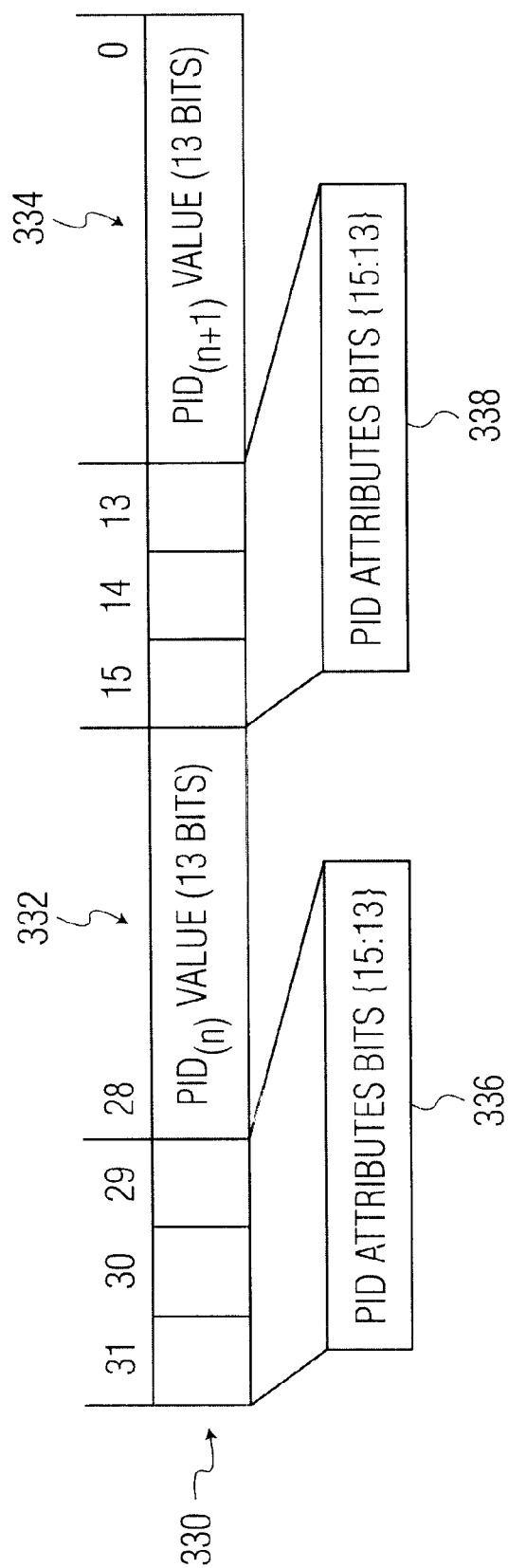
FIG. 4 illustrates the format in which predetermined PID values are stored in the PID match table.

FIG. 4 illustrates the format in which the PID values are stored in the PID match table. Table location 330 includes two PID values, shown as 13-bit $PID_{(n)}$ 332 and 13-bit $PID_{(n+1)}$ 334. Associated with each PID value is one or more attribute bits, which in one embodiment includes three attribute bits. $PID_{(n)}$ 332 is associated with attribute bits 29, 30 and 31, represented by attribute block 336. $PID_{(n+1)}$ 334 is associated with attribute bits 13, 14 and 15, represented by attribute block 338. The PID attribute details are described in Table 1 below.

TABLE 1

| Bits [15:13];[31:29] | | | Description |
| --- | --- | --- | --- |
| 0 | X | X | Invalid PID |
| 1 | 0 | 0 | Valid PID - Transport Stream |
| 1 | 0 | 1 | Valid PID - Transport Stream (1394 Enable) |

Each of the bit patterns of the attribute block can be used to represent a particular characteristic of the PID that was received. For example, where bit 15 is binary 0, it indicates an invalid PID whether it is a PCR packet or not. Where bits 15, 14 and 13 are binary 100, it indicates a valid transport stream PID.

Figure 5:
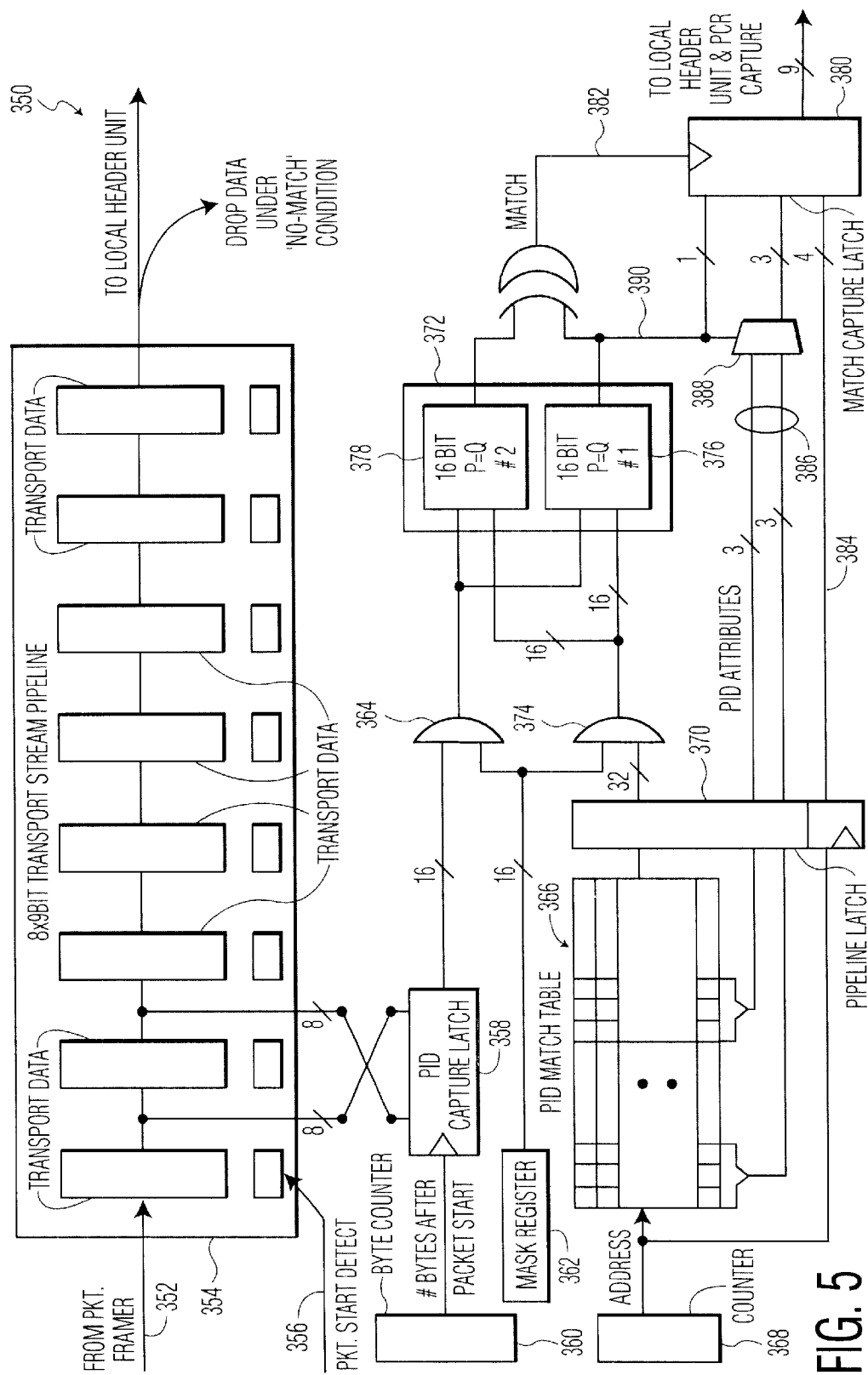
FIG. 5 is a block diagram of one embodiment of a PID match unit.

FIG. 5 is a block diagram of one embodiment of a PID match unit 350. The objective of the PID match unit 350 is to extract the PID information from the transport packets of the transport stream, for comparison with known PID table entries. The packet framer provides the transport packets to the PID match unit 350 via path 352 upon the occurrence of the SYNC_LOCK signal. The data is shifted into the transport stream pipeline 354 upon each occurrence of a shift clock after the PACKET_START signal has been detected as illustrated on line 356. The PACKET_START signal is propagated through the transport stream pipeline 354 as the transport packet propagates through the pipeline to signify the start of the transport packet. The transport stream pipeline allows the transport packets to be passed to the local header unit at the proper time. This time delay allows various functions to be performed, including locating a PID match in the PID match table, and computing the local header. For example, at a channel rate of 7.5 MB/sec (megabytes per second) and a system clock rate of 54 Mhz, it can be estimated that the PID capture time is 2 channel clock cycles for DSS and 3 channel clock cycles for DVB, which requires 3 stages of the pipeline. The PID compare time under this system clock frequency would be approximately 16 clock cycles (2 PIDs per clock cycle and 32 PIDs total), synchronization and pipeline delays of approximately 4 clock cycles, control state machine delays of approximately 4 clock cycles, and a local header computation of 4 clock cycles for a total of approximately 28 clock cycles or another 4 pipeline stages. This results in at least 7 pipeline stages, and therefore in one embodiment of the invention as shown in FIG. 5 an 8-stage transport stream pipeline provides timing assurance.

The PID capture latch 358 captures the PID information after a predetermined number of bytes past the PACKET_START signal as determined by the byte counter 360. This 16-bit value is masked using the PID mask register 362 and the AND block 364, where the result compared to the data from the PID table 366 two PIDs at a time. This masking operation is needed to obtain only the relevant bits for the comparison. The header constitutes 4 bytes of the 188 byte MPEG packet, where 2 bytes of the 130 bytes in the DSS are called pre-fix. The PID is contained within the 13 bits of information that straddles bytes 2 and 3 of a standard MPEG packet; and in the DSS format, the PID consists of 12 bits of the 2 byte pre-fix data. The PID capture latch collects a total of 16 bits. During the comparison, the non-PID bits must be ignored where the upper 3 bits are masked within the DVB and the upper 4 bits are masked within the DSS.

The compare operation is accomplished by comparing the data from the PID table 366 two PIDs at a time. This is accomplished by providing a counter 368 which counts through each of the 16 locations in the PID match table 366, which enables the two PIDs at the current PID match table location to enter the pipeline latch 370, and to enter the compare unit 372 after masking by the AND block 374. The compare unit 372 includes two comparators 376 and 378 to concurrently compare the current PID value in the PID capture latch 358 to each of the PID values from the PID match table 366 at the location designated by the counter 368. Upon recognition of a match, the match capture latch 380 is updated via its clock input by the match signal shown on line 382. The match capture latch 380 the current counter value on path 384, as well as the PID attribute bits on paths 386 that correspond to the matched PID. Multiplexing unit 388 selects the matching PID attributes according to the state of the match bit on line 390. The match logic operates as follows: line 390 indicates that the second entry is matched. If the match 382 is true and line 390 is true, the system recognizes that the second entry is matched. If the match 382 is true and line 390 is false, the system recognizes that the first entry is matched. The line 390 also is used to select which of the two entries are to be captured into the match capture latch 380.

The PID match unit 350 stalls on the detection of a match. The match detection time for a particular entry in the PID table is deterministic, which allows for precise loop timings for PCR recovery. As will be described in greater detail in the ensuing description, the counter value on path 384 represents an address index which can be used to address particular memory queues corresponding to information identified by its PID. The address index can be used by a processing unit to generate a physical memory address where the particular transport packet will ultimately be stored prior to transmission to decoding units. The use of the address index in the local header allows a destination location to be designated without the need to develop the complete physical address until it is necessary to actually write the transport packet to its corresponding memory queue. The benefits of address indexing and a description of physical address translation may be determined in a manner described herein and in copending U.S. patent application Ser. No. 09/205,480, entitled "Direct Memory Access Execution Engine with Indirect Addressing of Circular Queues in Addition to Direct Memory Addressing", which is assigned to the assignee of the instant application and filed concurrently herewith, the contents of which are incorporated herein by reference.

Under a match condition, the match capture latch 380 stores the PID location address from the PID match table 366 (counter 368 value), the match information on line 390, and the PID attribute bits in the following format to be forwarded to the local header unit:

TABLE 2

| | PID Attribute Bits | | |
|---|---|---|---|
| PID MATCH[8] | PID MATCH[7:5] | PID MATCH[4] | PID MATCH [3:0] |
| 1=Match 0=No Match | PID Attributes | 0=PID_data [15:0] matched 1=PID_data[31:16] matched | PID_data address of match |

The PID match bits [7:5] represent the PID attributes, bits [4:0] represent the address index that is formulated by the counter 368 of FIG. 5, and bit [8] indicates whether a match was detected during the compare process. This compare process terminates on detection of a match, or upon reaching the end of the PID match table 366 in a "No Match" condition. All processor PID update cycles are inhibited during this operation, and any access attempts during a PID compare cycle are postponed. Alternatively, the processor may terminate the PID compare process to update the PID table.

Figure 6:
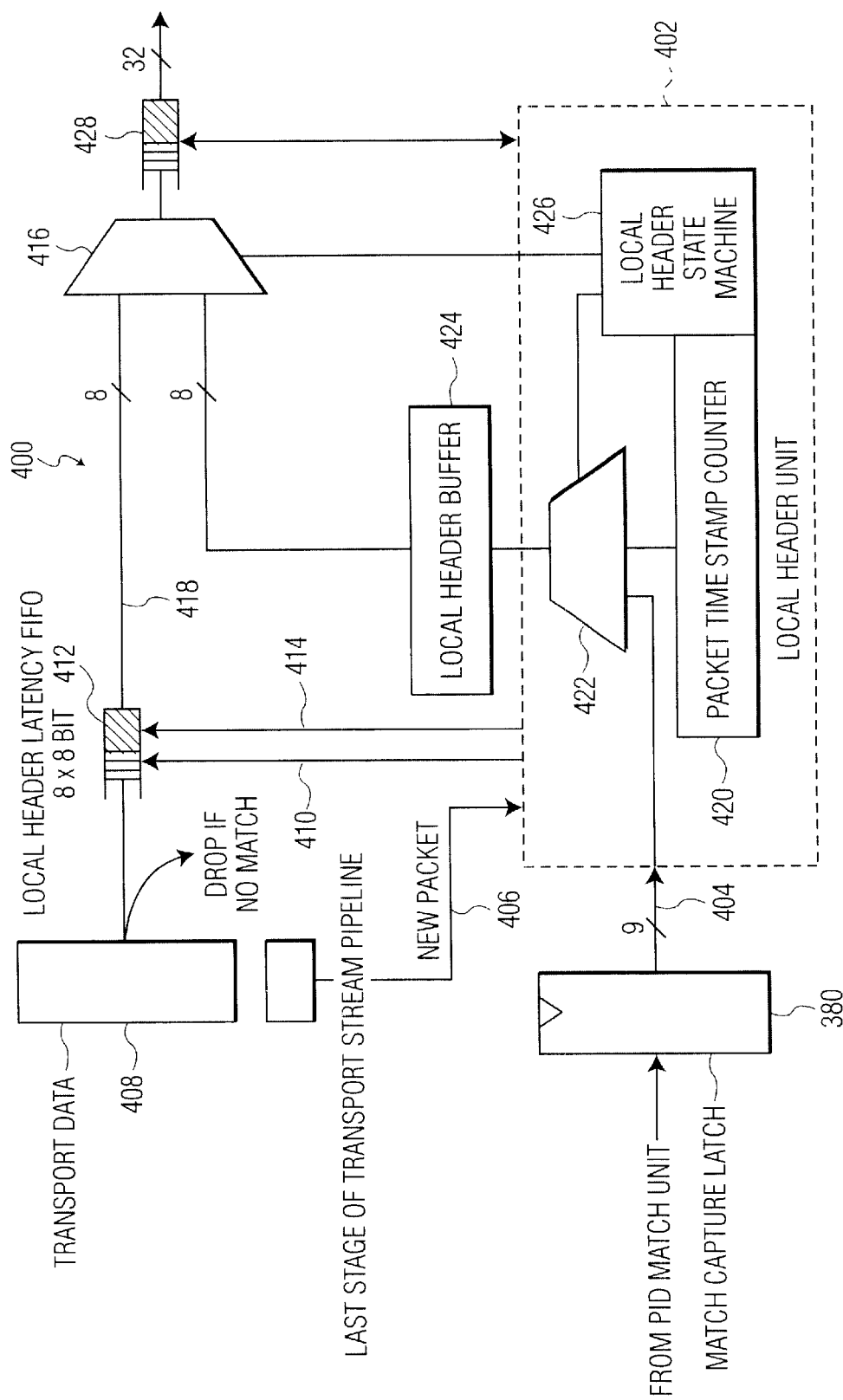
FIG. 6 is a block diagram generally illustrating the operation of the local header unit in the transport demultiplexing system.

FIG. 6 is a block diagram generally illustrating the operation of the local header unit 400 in the transport demultiplexing system. The PID match unit 350 of FIG. 5 is coupled to the local header unit 400 through the match capture latch 380, also shown in FIG. 5. The PID match output data, described in Table 2 above, is provided to the local header unit 402 via path 404. The PACKET_START signal that propagated through the transport stream pipeline 354 of FIG. 5 is also provided to the local header unit 402 via line 406 to indicate that a new transport packet has arrived. The local header unit 402 reads the match condition bit [8] from the PID match output data on path 404 to determine whether a PID match occurred. If not, the transport packet is discarded from the last stage 408 of the transport stream pipeline. If there is a match, the local header unit 402 reads the PID match attribute bits [7:5] to determine if it is a valid transport packet, and if so, provides an input enable signal on line 410 to allow the transport packet to enter the local header latency FIFO 412. The depth of the local header latency FIFO 412 is a function of both the content of the local header and the system frequency, and is designed to temporarily stage the transport packet until the local header has been generated. An output enable signal shown on line 414 enables the FIFO 412 to be read until the end of the transport packet is reached. The transport packet is provided in stages to the multiplexer 416 via path 418.

The local header unit 402 creates a unique "local" header to be inserted at the start of each transport packet. The local header unit 402 uses the PID match attributes [7:5]] from path 404 to build the local header. The local header serves a variety of purposes, including generating IEEE-1394 enable information, generating time stamp information for IEEE-1394 support, providing matched PID location information, padding the packets to align bytes to the memory controller's natural boundary (burst transfer), and generating processor interrupts on arrival of particular packets (particularly PCR packets). The structure of the local header as created by the local header unit 402 is illustrated in Table 3 below.

Byte 3 in this embodiment is reserved for future expansion. Byte 2 stores a counter value generated by the local header unit, and is an incremental counter value which increments for every transport packet received, regardless of whether a PID match occurred. This counter value serves as time stamp information to retain the real-time information of the transport stream, which can be used to maintain synchronization of an IEEE-1394 interface. This 8-bit value allows for 256 time stamp values. Bytes 4–13 are not used for DVB system streams, but are used to ensure the packet lengths are multiples of 16 in DSS system streams.

Returning to FIG. 6, it can be seen that the PID attributes (including the IEEE-1394 enable attribute bit) received from path 404 are entered into bits 2–0 of byte 1 of the local header. Similarly, the matched PID location received from path 404 are entered into bits 4–0 of byte 0 of the local header. The packet time stamp counter 420 generates the incremental counter value that is stored in byte 2 of the local header. The counter value, along with DSS bytes where appropriate, are multiplexed using multiplexing unit 422 and stored in the local header buffer 424 in 8-bit segments. The local header state machine 426 controls the multiplexing unit 422 to generate the local header by outputting the information in the proper order. The local header buffer 424 buffers the local header bytes as they are provided to the multiplexing unit 416, which is also controlled by the local header state machine 426. Therefore, the local header state machine 426 controls the output of the local header unit 402 such that the local header is arranged properly, and further

TABLE 3

Local Header Data Structure

| Byte # | bit 7 | bit 6 | bit 5 | bit 4 | bit 3 | bit 2 | bit 1 | bit 0 |
|---|---|---|---|---|---|---|---|---|
| Byte 0 | | | | | Matched PID Location (address index) | | | |
| Byte 1 | | | (Reserved) | | | 1394_En | ATTR | ATTR |
| Byte 2 | | | Transport Sequence time stamp (0–255) | | | | | |
| Byte 3 | | | | | (Reserved) | | | |
| Byte 4–15 | | | | | (Reserved for DSS) | | | |

In one embodiment of the invention, the local header is created as depicted in Table 3, which includes between 4 to 12 bytes depending on the type of system stream provided. Where the transport packets comprise a Digital Video Broadcast (DVB) system stream, only four local header bytes are necessary. Where the transport packets comprise a Digital Satellite System (DSS) system stream, twelve local header bytes are used. The local header size is a function of the memory controller burst length and parsing information. Bytes 4–13 are reserved at this time for future use. At the present time, these bytes are marked 00. This data block is padding to fill the packets to ensure the packet length is a multiple of 16 bytes to optimize performance.

Byte 1 includes at least three fields. Bit 2 is an IEEE-1394 enable field, bits 1–0 store attribute bits. Byte 0 includes bits 4–0 that are used to store the matched PID location which was determined by the PID match unit 350 of FIG. 5 and captured in the match capture latch 380. The IEEE-1394 bit in the 1394 field at bit location 2 controls the routing of the transport stream to a IEEE-1394 link controller. This bit corresponds to one of the PID attribute bits described in connection with FIG. 4 and Table 1. Particularly, this bit corresponds to the PID attribute bit at location [13] or [29] of the PID match table 366 of FIG. 5. Bits 1–0 correspond to the remaining two attribute bits associated with each PID in the PID match table.

ensures that the local header is transmitted immediately prior to its corresponding transport packet from path 418. The local header state machine works with the following pseudo-code: Wait for packet start signal 406 if local header latency FIFO 412 is empty: a) shift the mux 416 to local header; b) push all local header bytes; c) when local header is done restore mux 416 to channel go back to waiting for next packet start signal 406.

The resulting transport packet, including its leading local header, is provided to the memory FIFO 428 for organized entry to the memory controller. In one embodiment of the invention the memory FIFO 428 and the storage memory are SRAMs, however DRAMs or other memories can be used.

Figure 7A:
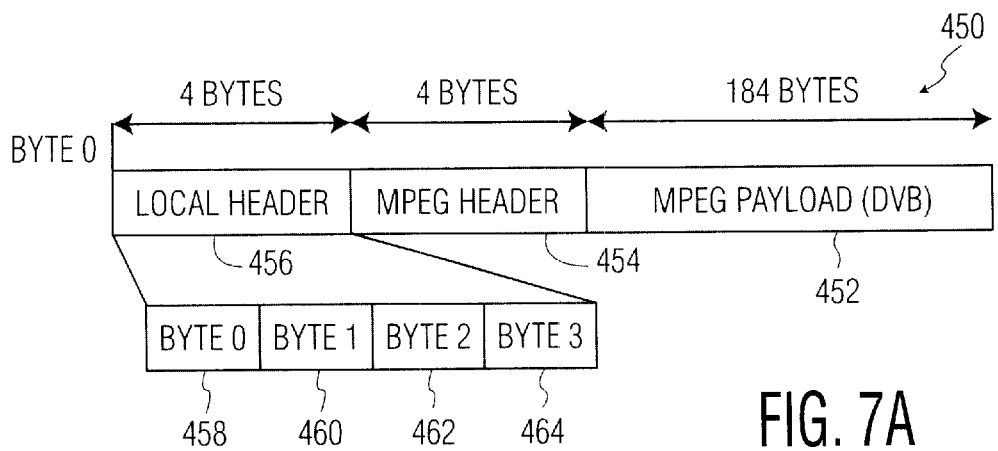
FIGS. 7A and 7B illustrate a modified transport packet, including the transport packet and its associated local header, for DVB and DSS system streams respectively.
Figure 7B:
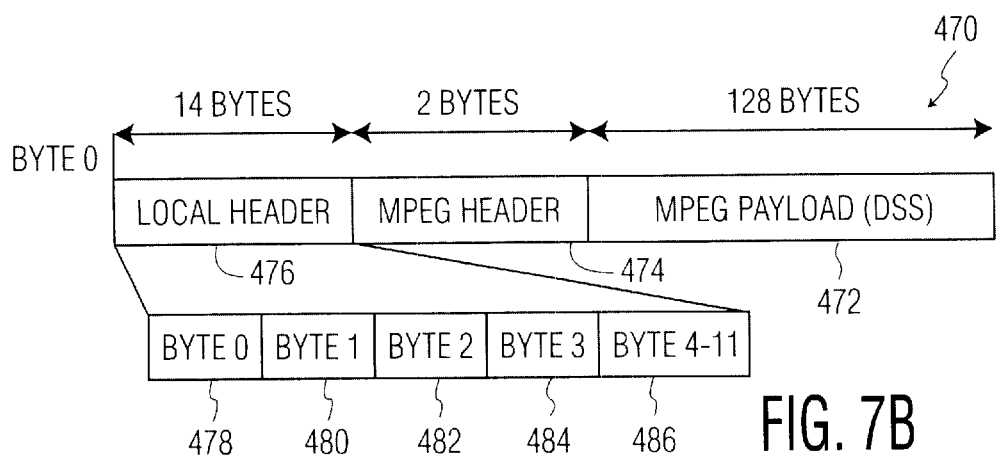

FIGS. 7A and 7B illustrate the resulting transport packet, including the transport packet and its associated local header, that is output from the multiplexing unit 416. While FIGS. 7A and 7B are described in terms of an MPEG system for DVB and DSS system streams respectively, it will be readily apparent to those skilled in the art from the description herein that other arrangements are possible.

FIG. 7A illustrates a modified DVB MPEG transport packet 450 that has been modified by the inclusion of a local header. The DVB MPEG payload 452 includes 184 bytes of payload information, which in turn includes PES headers and payload from its corresponding elementary stream. The MPEG header 454 consists of 4 bytes, and the leading local header 456 includes 4 bytes shown as byte-0 458, byte-1 460, byte-2 462, and byte-3 464, resulting in a 192-byte "local" packet. Similarly, as shown in FIG. 7B, the modified DSS MPEG transport packet 470 includes a 128-byte DSS MPEG payload 472, and a 2-byte MPEG header 474. The local header 476 includes 12 bytes, including byte-0 478, byte-1 480, byte-2 482, byte-3 484, and byte-4 through byte 11 represented by block 486, resulting in a 144-byte "local" packet.

Figure 8:
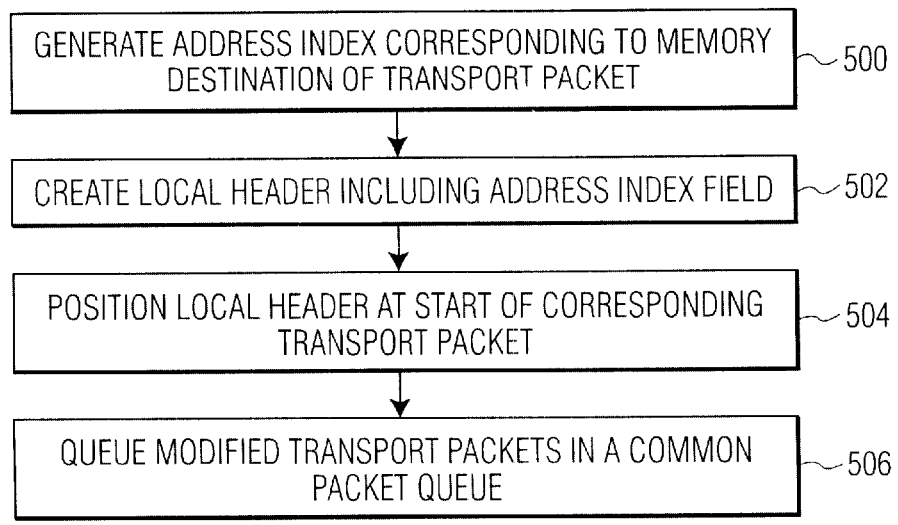
FIG. 8 is a flow diagram illustrating a general embodiment of a method of using a locally-generated header in a transport packet demultiplexing system in accordance with the present invention.

FIG. 8 is a flow diagram illustrating a general embodiment of a method of using a locally-generated header in a transport packet demultiplexing system in accordance with the present invention. An address index corresponding to the memory destination of each transport packet that has a matching PID in the PID match table is generated at block 500. A local header is created 502 that includes an address index field for the address index, as well as other fields previously described. In one embodiment of the invention, the local header is positioned 504 at the start of its corresponding transport packet. This is accomplished by transmitting the local header bytes in their proper arrangement immediately prior to transmitting the corresponding transport packet. While the local header could be positioned differently with respect to the transport packet (e.g., after transport packet header), this would require additional counting and/or processing means, and therefore the preferred embodiment positions the local header at the beginning of the transport packet. The resulting modified transport packets (i.e., transport packets and assigned local headers) are aggregately stored 506 in a common packet queue in one embodiment of the invention. Therefore, this queue is a first-in-first-out queue of the transport packets and all corresponding information necessary to manage and distribute the transport packets throughout the system, due to the inclusion of the local header to the transport packets in the queue. Each modified transport packet can then be processed without the need to collect other information external to the information already contained within the modified transport packet.

Figure 9:
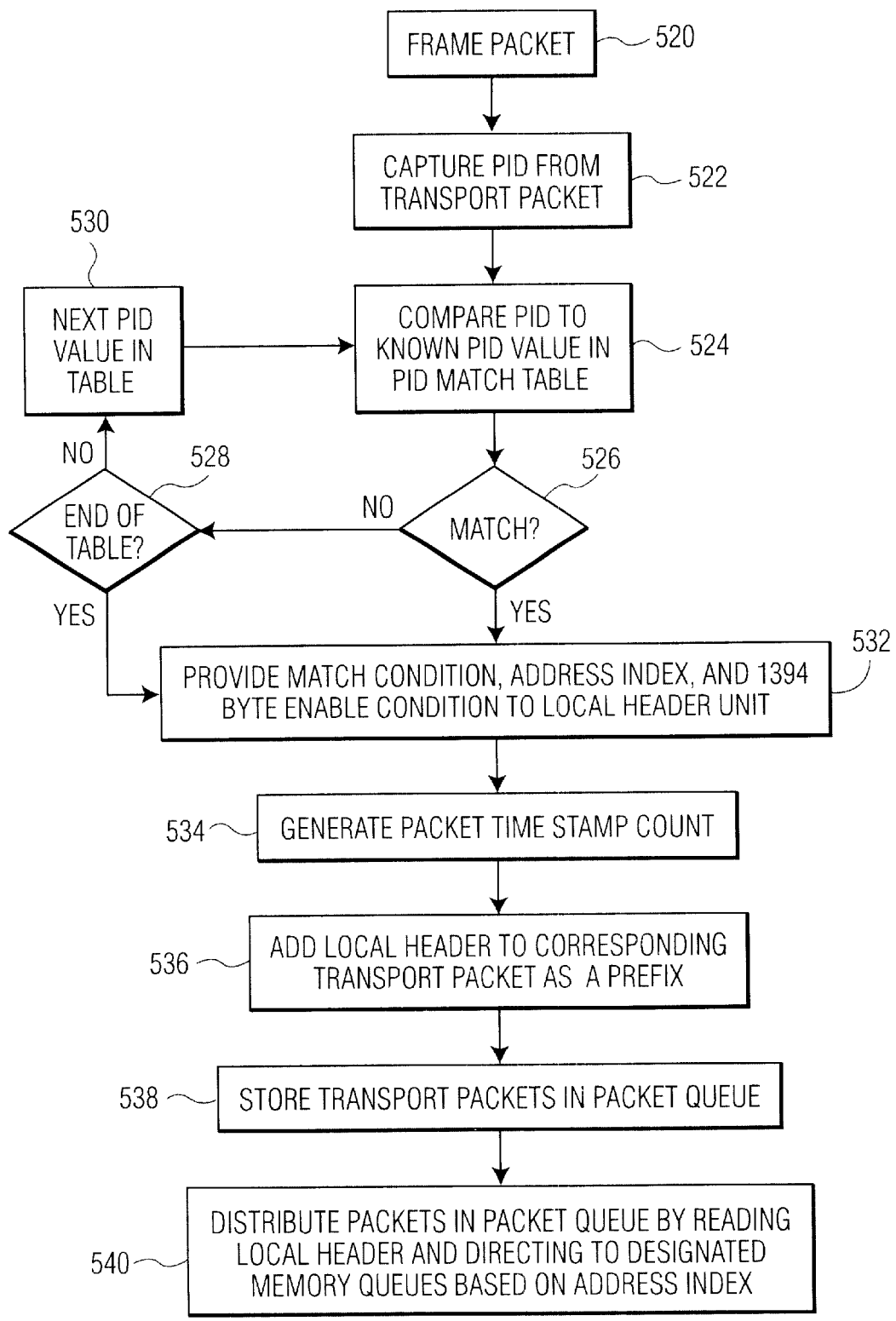
FIG. 9 is a flow diagram illustrating an embodiment of a method for using a locally-generated header to govern separation and storage of transport packets for subsequent distribution to corresponding decoding modules in accordance with the present invention.

FIG. 9 is a flow diagram illustrating an embodiment of a method for using a locally-generated header to govern separation and storage of transport packets for subsequent distribution to corresponding decoding modules in accordance with the present invention. The packet is framed 520 to organize the transport packet data as required for use by the system. For example, in one embodiment of the invention, the transport packets are framed in 8-byte wide segments, regardless of whether the transport packets are input serially or in parallel. Serially input transport packets are converted to parallel, 8-byte wide data segments.

The PID associated with each of the transport packets is extracted and latched as represented by block 522. This can be accomplished by knowing which bytes of a transport packet include the PID, counting the number of bytes from the start of a transport packet, and latching transport packet PID bytes when the count number reaches the known PID byte number(s). In one embodiment of the invention where MPEG-2 transport packets include a 16-bit PID, two bytes at the output of two successive latches in the transport stream pipeline are latched to capture the 16-bit PID.

The captured transport packet PID is compared 524 to known PID values. In one embodiment of the invention, this is accomplished by comparing the captured transport packet PIDs to values stored in PID match table. In another embodiment of the invention, multiple comparisons occur concurrently to speed the process. For example, the embodiment of FIG. 6 concurrently compares two of the PID match table values to a captured PID. As would be appreciated by those skilled in the art, a wider PID table and more comparators could be implemented, and a greater number of concurrent comparisons could thereby be performed. If a captured PID does not prove to equivalently compare to the currently-designated PID values in the PID match table as determined at decision block 526, it is determined 528 if the comparison process has reached the end of the match table. If the end of the table has not yet been reached, the next PID value(s) in the PID match table are designated for comparison as shown at block 530, and another comparison 524 is performed. If the end of the table has been reached as determined at block 528, or if a match is found at block 526, the information is sent to the module that generates the local header. Therefore, the match condition (e.g., "match", "no match"), the address index, and other information including the IEEE-1394 byte enable and attributes are provided 532 to the local header unit. The local header unit generates 534 a packet time stamp count, and uses the other information received to create a local header which is then added 536 to its corresponding transport packet as a packet prefix.

The local header assists in local packet management that is necessary to properly organize and distribute multimedia data streams to their corresponding decoders in the set-top box system. The modified transport packets (i.e., transport packets and assigned local headers) are aggregately stored 538 in a common packet queue in one embodiment of the invention.

Each of the transport packets are read from the common packet queue at a designated time. In one embodiment of the invention, an interrupt is generated to the processor when the common packet queue reaches a predetermined occupancy level. The use of such a common queue and the associated processing operation may be determined in a manner described herein and in copending U.S. patent application, Ser. No. 09/205,482, entitled "Memory-Based Circular Queue with Local Descriptive Information to Implement a Storage Area for Filtering MPEG-2 Packets that are Distributed and/or Processed Under the Control of a Host Microprocessor by a Direct Memory Access Mechanism", which is assigned to the assignee of the instant application and filed concurrently herewith, the contents of which are incorporated herein by reference.

The processing module reads the local header from each of the modified transport packets received from the common packet queue, and distributes the transport packets to designated memory queues based on the address index obtained from the local header, as illustrated at block 540. The original transport packets having common PID values are therefore separately queued in the designated memory queues. The separately-stored information in these memory queues represent the various digital programs and elementary streams that can be decoded and presented to a user as audio, graphical, textual, or other multimedia content.

Other embodiments of the invention will be apparent to those skilled in the art from consideration of the specification and practice of the invention disclosed herein. For example, many of the principles described herein may also be applied to other digital audio/video communications systems other than those defined by the MPEG standards, or to program stream applications which typically focus on local media versus a networked environment. It is intended that the specification and examples be considered as exemplary only, with a true scope and spirit of the invention being indicated by the following claims.

What is claimed is:

1. A method for enhancing transport packet demultiplexing and distribution in a digital transport demultiplexing system that inputs a stream of digital multimedia transport packets, wherein each of the transport packets includes a packet identifier (PID) that is adapted to identify a digital program or elementary stream to which the PID corresponds, the method comprising:

generating local packet information for each of the transport packets for use in identifying and distributing the transport packets;

creating a local header that includes at least some of the generated local packet information; and linking the local header to its corresponding one of the transport packets to create modified transport packets;

whereby each of the modified transport packets comprises a self-contained digital transport packet having local distribution information contained therein.

2. The method as in claim 1, further comprising storing the modified transport packets for subsequent distribution within the digital transport demultiplexing system.

3. The method as in claim 1, wherein generating local packet information comprises generating a destination memory address for each of the transport packets based on the PID within the transport packet.

4. The method as in claim 3, wherein generating the destination memory address comprises creating an address index corresponding to a relative address at which the transport packet is ultimately stored in memory.

5. The method as in claim 4, wherein creating an address index comprises determining a relative location of a predetermined PID value that matches the PID within the transport packet from a table of predetermined PID values.

6. The method as in claim 5, wherein determining a relative location of a predetermined PID value comprises comparing each of the predetermined PID values in the table to the PID within the transport packet, and latching a table address corresponding to a table location of the predetermined PID value that matches the PID within the transport packet according to claim 4.

7. The method as in claim 6, further comprising incrementing a counter each time a subsequent one of the predetermined PID values in the table is compared to the PID within the transport packet, wherein a counter value provided by the counter corresponds to the table address combined with the column offset within the table.

8. The method as in claim 1, wherein creating a local header comprises successively outputting a number of local header bytes containing the generated local packet information.

9. The method as in claim 8, wherein successively outputting a number of local header bytes comprises receiving the generated local packet information, and enabling selected portions of the generated local packet information to be successively driven onto a bus.

10. The method as in claim 1, wherein creating a local header comprises creating at least one data segment which includes at least some of the generated local packet information.

11. The method as in claim 10, wherein creating at least one data segment comprises creating a plurality of data bytes, wherein at least some of the plurality of data bytes comprise predefined data fields associated with selected portions of the generated local packet information.

12. The method as in claim 11, wherein one of the predefined data fields comprises an address index field to retain an address index corresponding to a memory destination address of the transport packet.

13. The method as in claim 11, wherein one of the predefined data fields comprises an attribute field to retain preselected characteristics of the transport packet.

14. The method as in claim 1, further comprising generating packet synchronization information.

15. The method as in claim 14, wherein creating a local header comprises creating a plurality of data bytes, wherein at least some of the plurality of data bytes comprise predefined data fields associated with selected portions of the generated local packet information, and wherein one of the predefined data fields comprises a transport sequence time stamp field to retain the packet synchronization information.

16. The method as in claim 1, wherein linking the local header to its corresponding transport packet comprises transmitting the local header immediately prior to its corresponding transport packet.

17. The method as in claim 16, wherein transmitting the local header immediately prior to its corresponding transport packet comprises:

enabling storage of the local header while suspending storage of the transport packet associated with that local header; and enabling storage of the associated transport packet upon completion of storage of the local header.

18. The method as in claim 17, wherein enabling storage of the local header comprises providing a control signal to a multiplexing module that outputs the local header to a temporary storage FIFO, and inhibits output of the associated transport packet from the multiplexing module.

19. The method as in claim 18, wherein enabling storage of the associated transport packet comprises providing a second control signal to the multiplexing module to output the associated transport packet to a temporary storage FIFO upon completion of the storing of the local header at the temporary storage FIFO.

20. The method as in claim 1, wherein storing the modified transport packets comprises collectively storing the modified transport packets in a common packet queue.

21. The method as in claim 20, wherein collectively storing the modified transport packets comprises collectively storing the modified transport packets in a single FIFO memory buffer.

22. The method as in claim 1, wherein the transport packets comply with an MPEG-2 standard.

23. A transport stream demultiplexing apparatus for use in a digital transmission system capable of providing a plurality of digital transport packets to a digital program presentation device, wherein each of the digital transport packets includes a packet identifier (PID) that is adapted to identify a digital program to which the PID corresponds, the transport stream demultiplexing apparatus comprising:

a PID match unit having a comparator to compare the PID from each of the transport packets to predefined PID values, and further including an address designator to provide a unique memory address identifier for each matching set of the PIDs and the predefined PID values;

a local header generation module, coupled to the PID match unit, to receive the unique memory address identifier and to arrange the unique memory address identifier into an address field to form a local header;

a local header affixation module having a control input to selectively direct either the transport packet or the local header, depending on a state of input control signals, to an output of the local header affixation module; and a packet arrangement control module coupled to the local header affixation module to provide the input control signals such that the local header affixation module outputs the local header immediately followed by a corresponding one of the transport packets.

24. The transport stream demultiplexing apparatus as in claim 23, wherein the PID match unit comprises a PID storage table to store the predefined PID values, and wherein each of the predefined PID values is associated with predefined attributes stored with their corresponding prefined PID values.

25. The transport stream demultiplexing apparatus as in claim 24, wherein the local header generation module is coupled to receive the predefined attributes from the PID match unit and to arrange the predefined attributes into at least one attribute field in the local header.

26. A transport stream demultiplexing apparatus for use in an MPEG-compliant digital transmission system capable of providing a plurality of digital transport packets to a digital program presentation device, wherein each of the digital transport packets includes a packet identifier (PID) that is adapted to identify a digital program to which the PID corresponds, the transport stream demultiplexing apparatus comprising:

(a) a transport packet analyzer coupled to receive the plurality of digital transport packets and to provide packet distribution information for each of the transport packets in response thereto;

(b) a local header affixation module having a control input to selectively provide either the transport packet or a local header, depending on a state of input control signals, to an output of the local header affixation module; and (c) a local header generation module comprising:
  (i) a local header sequencing module coupled to the transport packet analyzer to receive and arrange the packet distribution information into a plurality of bytes to create a multi-byte local header; and
  (ii) a packet arrangement control module to generate and provide the input control signals to the local header affixation module, wherein the input control signals direct the local header affixation module to output the local header immediately prior to a corresponding one of the transport packets to form a modified transport packet.

27. The transport stream demultiplexing apparatus as in claim 26, further comprising a transport packet framer to receive the plurality of digital transport packets and to provide the transport packets to the transport packet analyzer in data segments having a predetermined number of parallel bits.

28. The transport stream demultiplexing apparatus as in claim 26, further comprising a processor coupled to the local header affixation module to receive the modified transport packets, wherein the processor is configured and arranged to direct the transport packets to one of a plurality of elementary stream decoders based on the packet distribution information contained in the local headers.

29. The transport stream demultiplexing apparatus as in claim 26, further comprising:

a circular queue coupled to the local header affixation module to receive the modified transport packets in a first-in-first-out fashion; and a processor coupled to the circular queue to receive the modified transport packets, wherein the processor is configured and arranged to direct the transport packets to one of a plurality of elementary stream decoders based on the packet distribution information contained in the local headers.

30. The transport stream demultiplexing apparatus as in claim 26, wherein the local header generation module further comprises a packet time stamp counter to count each of the plurality of transport packets received to provide a count value used in maintaining synchronization of an interface, wherein the interface complies with an IEEE-1394 standard and wherein the local header sequencing module incorporates the count value into the multi-byte local header.

31. The transport stream demultiplexing apparatus as in claim 26, wherein the transport packet analyzer comprises:

means for comparing the PID from each of the transport packets to predefined PID values;

means for providing an address index as part of the packet distribution information upon detection of a matched one of the predefined PID values and the PID; and means for storing the modified transport packets in separate memory locations based on the address index corresponding to each of the modified transport packets.

32. The transport stream demultiplexing apparatus as in claim 26, wherein the transport packet analyzer comprises:

a configurable PID storage table to store the packet distribution information including predefined PID values and corresponding transport packet attributes;

a comparator to compare the PID from each of the transport packets to the predefined PID values to locate a match; and an address designator to provide a unique memory address identifier for each matching set of the PIDs and the predefined PID values.

33. The transport stream demultiplexing apparatus as in claim 32, wherein the transport packet analyzer comprises a plurality of the comparators to concurrently compare a plurality of the predefined PID values to the PID.

34. The transport stream demultiplexing apparatus as in claim 32, wherein the address designator comprises a counter having a counter value output which progressively designates each of the predefined PID values to be compared to the PID, wherein the counter value output corresponds to the unique memory address identifier upon recognition of the matching set of the PID and the predefined PID value.

35. The transport stream demultiplexing apparatus as in claim 32, wherein the transport packet analyzer further comprises a transport stream pipeline including a plurality of daisy-chained registers, and wherein the transport packets are propagated through the transport stream pipeline to provide the transport packet to the local header affixation module when a PID match condition has been determined, thereby accounting for transport packet analyzer processing time.

36. The transport stream demultiplexing apparatus as in claim 35, wherein the PID within each of the transport packets is located at a predetermined byte count within the transport packet, and where the transport packet analyzer further comprises:

a PID byte counter to count the number of bytes transmitted from the start of each of the transport packets; and a PID capture latch coupled to an output of at least one of the daisy-chained registers in the transport stream pipeline to latch the PID when the PID byte counter reaches the predetermined byte count.

37. For use in a digital transport demultiplexing system that inputs a stream of digital multimedia transport packets, a method for demultiplexing and distributing transport packets, wherein each of the transport packets includes a packet identifier that is adapted to identify a digital program or elementary stream to which the packet identifier corresponds, the method comprising:

generating local packet information for each of the transport packets;

creating a local header that includes at least some of the generated local packet information; and linking the local header to a corresponding one of the transport packets and therein creating modified transport packets, each of the modified transport packets including a self-contained digital transport packet having local distribution information contained therein.

38. A digital transport demultiplexing system that inputs a stream of digital multimedia transport packets, a method for demultiplexing and distributing transport packets, wherein each of the transport packets includes a packet identifier that is adapted to identify a digital program or elementary stream to which the packet identifier corresponds, the system comprising:

means for generating local packet information for each of the transport packets;

means for creating a local header that includes at least some of the generated local packet information; and means for linking the local header to a corresponding one of the transport packets and therein creating modified transport packets with each of the modified transport packets including a self-contained digital transport packet having local distribution information contained therein.

* * * * *